United States Patent
Paduvalli et al.

(10) Patent No.: US 11,689,464 B2
(45) Date of Patent: Jun. 27, 2023

(54) OPTIMIZING ENTRIES IN A CONTENT ADDRESSABLE MEMORY OF A NETWORK DEVICE

(71) Applicant: Arista Networks, Inc., Santa Clara, CA (US)

(72) Inventors: Ramakrishna Shivaramaiah Paduvalli, San Jose, CA (US); Xuanran Zong, Sunnyvale, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/578,128

(22) Filed: Jan. 18, 2022

(65) Prior Publication Data

US 2022/0141136 A1     May 5, 2022

Related U.S. Application Data

(63) Continuation of application No. 16/984,912, filed on Aug. 4, 2020, now Pat. No. 11,245,625.

(60) Provisional application No. 62/884,077, filed on Aug. 7, 2019.

(51) Int. Cl.
*H04L 45/745*     (2022.01)
*H04L 45/50*     (2022.01)
*H04L 47/2483*     (2022.01)
*H04L 47/2441*     (2022.01)

(52) U.S. Cl.
CPC ........ *H04L 45/74591* (2022.05); *H04L 45/50* (2013.01); *H04L 47/2441* (2013.01); *H04L 47/2483* (2013.01)

(58) Field of Classification Search
CPC .............. H04L 45/74591; H04L 45/50; H04L 47/2441; H04L 47/2483; H04L 45/00; H04L 45/7453
See application file for complete search history.

(56) References Cited

U.S. PATENT DOCUMENTS

| | | | |
|---|---|---|---|
| 7,089,555 B2 | 8/2006 | Calvignac et al. | |
| 9,930,145 B2 | 3/2018 | Callard | |
| 10,069,720 B2 | 9/2018 | Varvello et al. | |
| 10,462,062 B2 | 10/2019 | Lin et al. | |
| 10,911,317 B2 | 2/2021 | Kazemian et al. | |
| 11,025,549 B2 * | 6/2021 | Mizrahi | H04L 47/2441 |
| 2020/0374231 A1 * | 11/2020 | Cai | H04L 45/74591 |

(Continued)

*Primary Examiner* — Chandrahas B Patel
(74) *Attorney, Agent, or Firm* — Fountainhead Law Group P.C.

(57) ABSTRACT

In some implementations, a method is provided. The method includes determining a plurality of field sets and a plurality of field set groups. Each field set of the plurality of field sets comprises one or more packet characteristics. Each field set group of the plurality of field set groups comprises one or more field sets from the plurality of field sets. Each field set group is associated with one or more packet classifier rules. The method also includes determining a set of encoded labels for the plurality of field sets based on a set of rule costs and intersections between field set groups. Each encoded label of the set of encoded labels is associated with a respective field set of the plurality of field sets. The method further includes generating a plurality of entries in a memory based on the set of encoded labels. At least one entry comprises an encoded label from the set of encoded labels and at least a portion of a packet classifier rule.

20 Claims, 9 Drawing Sheets

(56) References Cited

U.S. PATENT DOCUMENTS

2021/0044528 A1   2/2021  Paduvalli et al.
2021/0409337 A1*  12/2021 Hu ..................... G06F 16/2228

* cited by examiner

OPTIMIZING ENTRIES IN A CONTENT ADDRESSABLE MEMORY OF A NETWORK DEVICE

CROSS-REFERENCE TO RELATED APPLICATIONS

This application is a continuation of U.S. patent application Ser. No. 16/984,912, filed Aug. 4, 2020, which claims the benefit of U.S. Provisional Patent Application No. 62/884,077, filed Aug. 7, 2019, the disclosures of which are hereby incorporated by reference herein for all purposes.

BACKGROUND

A network device may be a device (e.g., a computing device, an electronic device etc.) capable of communicating data with other devices through a wired or wireless connection or set of connections. For example, a network device may receive data from a first device (e.g., a computing device, a switch, a router, etc.) and may forward the data to a second device (e.g., a computing device, a switch, a router, etc.). A network device may include various types of hardware that may be used to transmit and/or receive data. For example, a network device may include line cards and each line card may include one or more processing devices (e.g., application specific integrated circuits (ASICs), field programmable gate arrays (FPGAs), processors, central processing units, forwarding engines, etc.) to transmit and/or receive data (e.g., network packets).

SUMMARY

In some implementations, a method is provided. The method includes determining a plurality of field sets and a plurality of field set groups. Each field set of the plurality of field sets comprises one or more packet characteristics. Each field set group of the plurality of field set groups comprises one or more field sets from the plurality of field sets. Each field set group is associated with one or more packet classifier rules. The method also includes determining a set of encoded labels for the plurality of field sets based on a set of rule costs and intersections between field set groups. Each encoded label of the set of encoded labels is associated with a respective field set of the plurality of field sets. The method further includes generating a plurality of entries in a memory based on the set of encoded labels. At least one entry comprises an encoded label from the set of encoded labels and at least a portion of a packet classifier rule.

In some implementations, a network device is provided. The network device includes a memory configured to store a data and a processing device coupled to the memory. The processing device is to determine a plurality of field sets and a plurality of field set groups. Each field set of the plurality of field sets comprises one or more packet characteristics. Each field set group of the plurality of field set groups comprises one or more field sets from the plurality of field sets. Each field set group is associated with one or more packet classifier rules. The processing device is also to determine a set of encoded labels for the plurality of field sets based on a set of rule costs and intersections between field set groups. Each encoded label of the set of encoded labels is associated with a respective field set of the plurality of field sets. The processing device is further to generate a plurality of entries in a memory based on the set of encoded labels. At least one entry comprises an encoded label from the set of encoded labels and at least a portion of a packet classifier rule.

In some implementations, a non-transitory machine-readable medium is provided. The non-transitory machine-readable medium has executable instructions to cause one or more processing devices to perform a method. The method includes determining a plurality of field sets and a plurality of field set groups. Each field set of the plurality of field sets comprises one or more packet characteristics. Each field set group of the plurality of field set groups comprises one or more field sets from the plurality of field sets. Each field set group is associated with one or more packet classifier rules. The method also includes determining a set of encoded labels for the plurality of field sets based on a set of rule costs and intersections between field set groups. Each encoded label of the set of encoded labels is associated with a respective field set of the plurality of field sets. The method further includes generating a plurality of entries in a memory based on the set of encoded labels. At least one entry comprises an encoded label from the set of encoded labels and at least a portion of a packet classifier rule.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
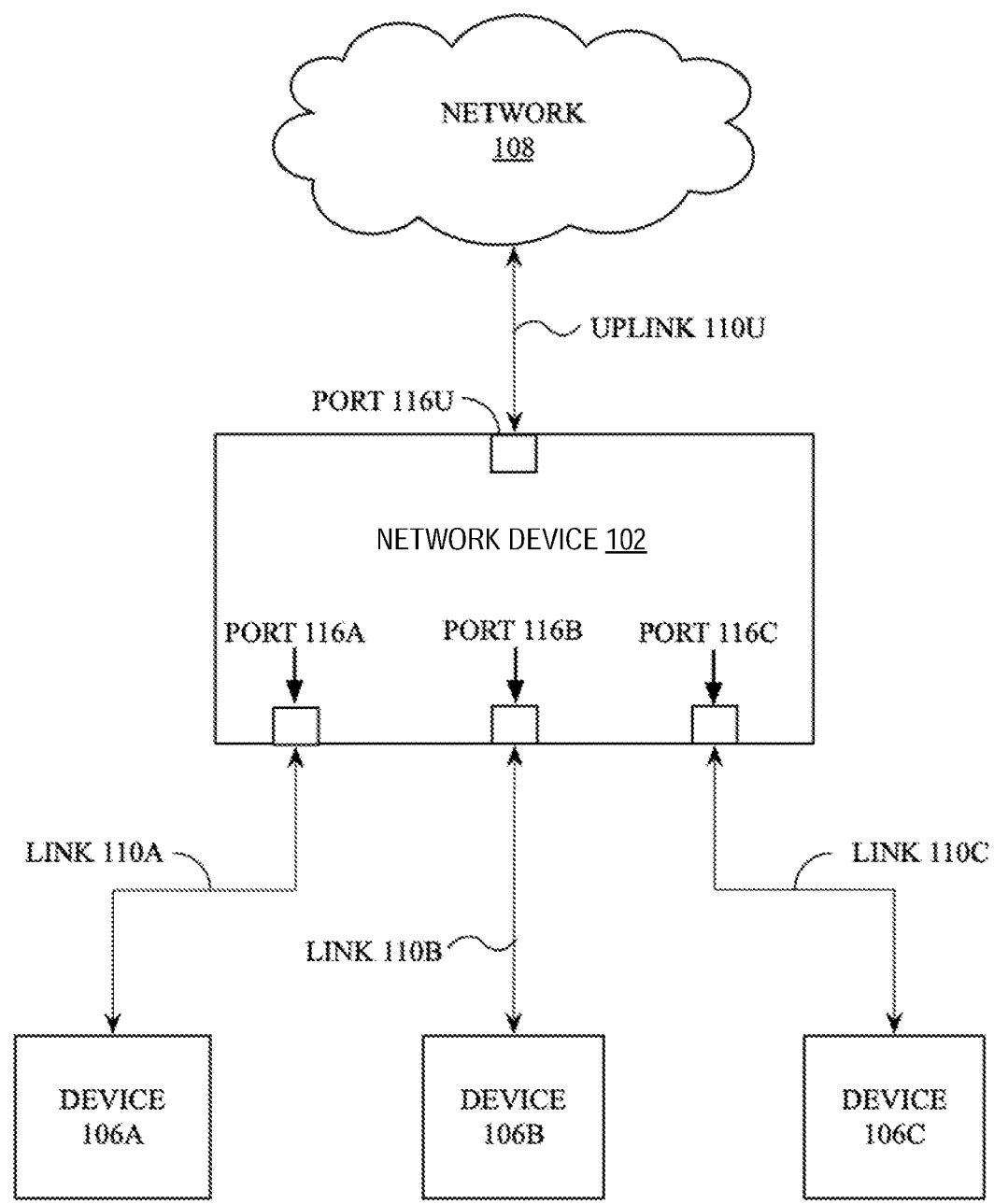
FIG. 1 is a block diagram of an example system that includes a network device communicating network data between a network and a number of devices, in accordance with some embodiments.

As discussed above, a network device may be a device (e.g., a computing device, an electronic device, etc.) that may communicate data with other devices (e.g., may receive data from a first device and may forward the data to a second device. A network device may include a control plane and a data plane. A control plane may process control information and write configuration data used to manage and/or configure the data plane. The control plane may also perform control management updates and/or respond with control message responses (e.g., routing decisions, protocol updates, traffic resolutions, etc.). The data plane receives, processes, and forwards network data (e.g., packets) based on the configuration data, as discussed in more detail below.

A network device may use one or more traffic policies to determine whether, when, and/or how to forward a packet (e.g., a unit of network data). One example of a traffic policy may be an access control list (ACL). A traffic policy may be a list of packet classifier rules. For example, a traffic policy may be a prioritized list of packet classifier rules, which classifier rules that are higher in the list have higher priority. Each packet classifier rule in the policy may be associated with a set of actions. Examples of actions are permit, deny, log, set a field in the packet to a value, set a next hop or next destination for a packet, etc. A packet classifier rule may include and/or indicate one or more fields of a packet. A field may be a portion of a packet, such as a portion of a header, a portion of the footer, etc. For example a field, may be an Internet Protocol (IP) source address, an IP destination address, a time to live, a medium access control (MAC) address, etc. A field may also be other data (e.g., metadata) that is derived based on a packet. For example, a field may be the port on which the packet arrived, a virtual local-area-network identifier (VLAN ID), etc. A packet classifier rule may also include one or more values for a field. For example, a packet classifier rule may include a value for a source IP address (e.g., the packet classifier rule may match a specific IP address). In another example, a packet classifier rule may include a range of IP addresses. A field and value for the field may be referred to as a field-value. Each packet classifier rule may include multiple field-values.

A traffic policy may be stored in and/or implemented using a TCAM. Each packet classifier rule in the traffic policy may be stored in one or more TCAM entries. For example, if a packet classifier rule indicates a two IP source addresses and a MAC address, the packet classifier rule may be stored on two TCAM entries. The first TCAM entry may include the first IP address, the MAC address and one or more actions. The second TCAM entry may include the second IP address, the MAC address and one or more actions. Each TCAM entry may include a key, mask and a result. Thus, each entry in the TCAM may include a portion of packet classifier rule. For example, an entry may include one of the two IP address, the MAC address, and one or more actions.

Because each packet classifier rule may be expressed as a set of field-values, the total number of TCAM entries used to represent a packet classifier rule may be a cross product of the field-values. For example, if a packet classifier rule indicates two source IP addresses (e.g., A and B) and two destination IP addresses (e.g., X and Y), then a total of four TCAM entries may be used to represent the packet classifier rule (e.g., a rule for A and X, a rule for A and Y, a rule for B and X, and a rule for B and Y).

As discussed above, network devices may use TCAMs to receive, process, and/or forward data packets. A TCAM may be a content addressable memory that allows for faster access to data stored in the TCAM using a key. The TCAM may return data for one or more entries in the TCAM that match a key. For example, a TCAM may return an entry that has the highest priority if there are multiple matches. A TCAM may be a more expensive component than other types of memory (e.g., may be more expensive that dynamic random access memory (DRAM)). A TCAM may also use more power than other types of memory (e.g., may use more power than DRAM) to operate. Because TCAM may be more expensive and may use more power, the amount of space (e.g., storage space, storage size, etc.) in a TCAM may be smaller than the amount of space in other types of memory (e.g., in DRAM of flash memory). Less data may be stored in a TCAM due to the smaller size of the TCAM. Thus, it may be useful to reduce the number of entries that may be used to represent packet classifier rules. This may allow the TCAM to store more packet classifier rules and/or may allow smaller TCAMs to be used.

Field summarization may be used by a network device to reduce the number of TCAM entries for a packet classifier rule. Field summarization may help reduce the number of TCAM entries by reducing the cross product of the field-values in the packet classifier rules. For example, a network device may determine the field-values that are used in one or more packet classifier rules. The network device may group, partition, divide, etc., the field-values into sets or groups of sets. These groups of field-values may be referred to as field sets. The field sets may be disjoint or non-overlapping field sets. For example, the field sets may be disjoint when each field-value is allocated to only one field set (e.g., the field sets to not share common field values). Each field set may be mapped or associated with a summarized value. The summarized value may be a number, an alphanumeric string, or some other identifier that may be used to indicate/identify a field set. The summarized value may also be referred to as a label, as discussed in more detail below, Generally, the size or number of field sets may be smaller than the namespace or possible values of the field. The labels (e.g., summarized values) which represent the field sets e.g., disjoint or non-overlapping field sets) may be used in the TCAM entries instead of the field values. For example, if there are 65536 possible field-values (e.g., for a 16-bit field), rather than using 65536 entries in the TCAM, the field-values may be divided into group and the groups may be represented using a label, such as a number. The number of groups may be smaller (e.g., much smaller) than the number of possible field-values. For example, the total number of field-values may be 65536 and the number of labels may be 6.

Although the number of TCAM entries used by the packet classifier rules may be reduced using field summarization, it may be useful to further reduce the number of TCAM entries. The number of TCAM entries may be further reduced by translating the summarized values to generate encoded labels (e.g., by encoding the labels to generated encoded labels). By using the encoded labels in the TCAM entries, the number of TCAM entries used can be further reduced.

In other embodiments, the rules may not be stored in a TCAM, which is generally more costly, consumes board space, and consumes more power. For example, rules can be stored in memory that is less costly than TCAMs such as, for instance, SRAMs. In some use cases, for example, speed of operation may not be so important as to merit the cost of a TCAM, and instead SRAMs can be employed along with a suitable search algorithm to provide the same rule searching functionality. The present disclosure may refer to TCAMs as examples for discussion purposes, without loss of generality and with the understanding that the present disclosure can be practiced in embodiments that do not use TCAMs. For example, the examples, implementations, and/or embodiments disclosed here may use SRAM, DRAM, and/or different types of memory and/or data structures that use ternary formats/values.

FIG. 1 is a block diagram of an example network system 100 that includes a network device 102 communicating network data between a network 108 and a number of devices 106A-C, in accordance with some embodiments. In various embodiments, network 102 is one or more of a switch, router, hub, bridge, gateway, etc., or any type of device that can provide access to a network 108 (e.g., physical network, virtualized network, etc.). In one embodiment, network device 102 couples to network 108 via an uplink 110U coupled to an uplink port 116U to provide network connectivity to devices 106A-C via respective links 110A-C coupled to ports 116A-C. Uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between network device 102 and devices 106A-C may also be wired connections. However, in some embodiments, links 110A-C are created over alternate connection types such as wireless connections or a combination of wired and wireless connections.

In one embodiment, devices 106A-C may be any type of device that can communicate network data with another device, such as a personal computer, laptop, or server. Devices 106A-C can also be a mobile device (e.g., phone, smartphone, personal gaming device, etc.), or another network device. In one embodiment, devices 106A-C can each be a virtual machine or can be a device that hosts one or more virtual machines. In one embodiment, network device 102 can also be a virtual machine.

In various embodiments, different types of protocols can be used to communicate network data over the connection (e.g., Ethernet, wireless, Synchronous Optical Networking (SONET), Fiber channel, Infiniband, etc.). The network data being communicated by network device 102 can be a stream of network frames, datagrams or data packets, or other types of discretely switched network data. As described herein, where individual elements of network data are referenced (e.g., frames, datagrams, or packets, etc.) the techniques described are applicable to any discretely switched network data form of network data. In one embodiment, network device 102 communicates network data between devices 106A-C and the network 108 or between devices 106A-C using a variety of communicating techniques (e.g., layer 2 switching, layer 3 routing, traffic shaping, applying a quality of service (QoS) policy, etc.

In one embodiment, network device 102 is part of a region within a larger network topology, where devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network device due to the processing time involved in buffering, queuing, processing and forwarding network data from a source port to a destination port in that network device.

Figure 2:
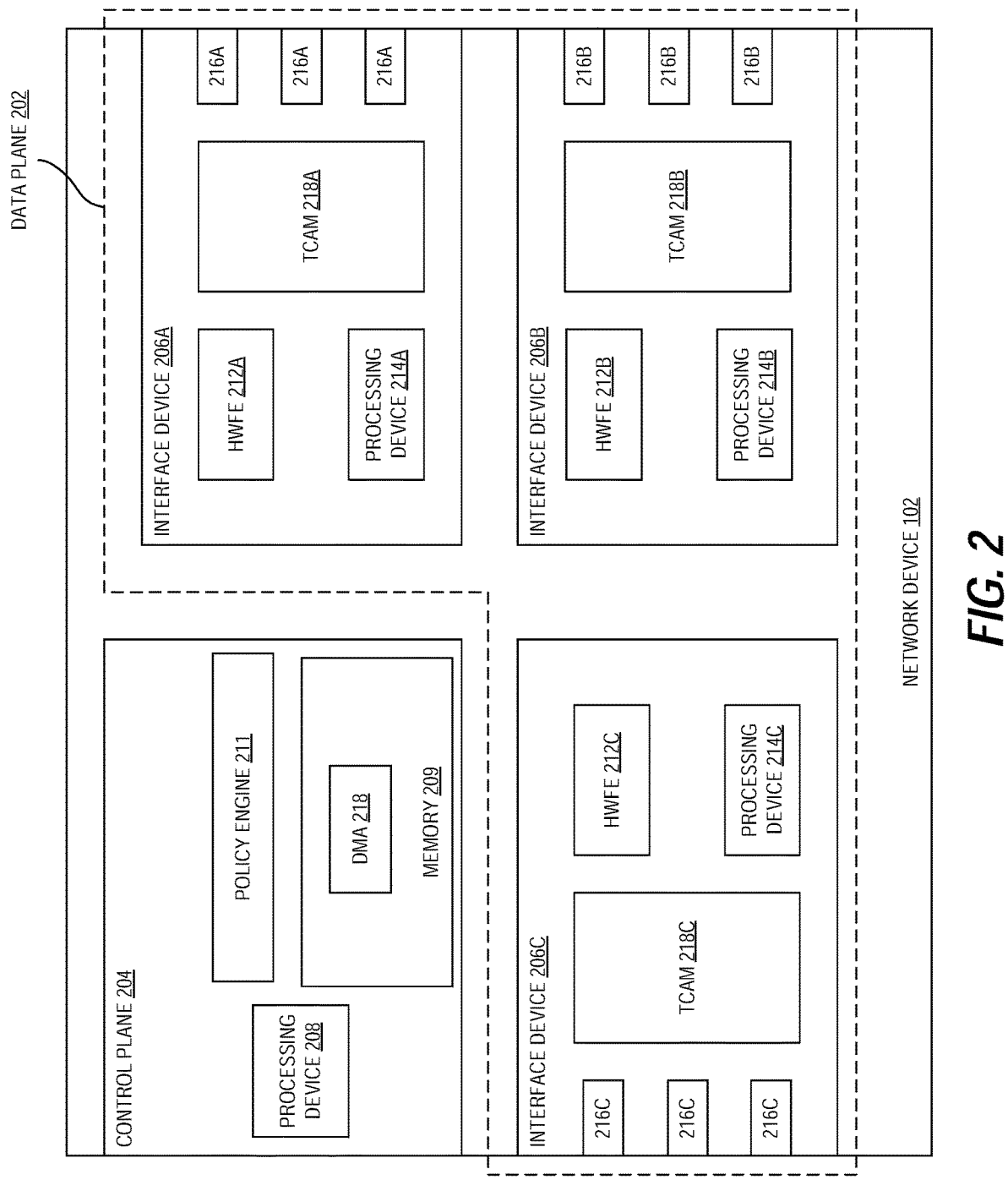
FIG. 2 is a block diagram of an example network device including a data plane coupled to a control plane and several interface devices, in accordance with some embodiments.

FIG. 2 is a block diagram of an example network device 102 that includes a data plane 202 coupled to a control plane 204 and several interface devices 206A-C, in accordance with some embodiments. In some network devices, data plane 202 is referred to as the forwarding plane. In one embodiment, the illustrated network device 102 is a variant of the network device 102 of FIG. 1. In one embodiment, control plane 204 includes central processing unit (CPU) 208 and memory 209 to store data. Processing device 208 is used to process information for control plane 204 and writes configuration data for hardware forwarding engines 212A-C in interface devices 206A-C. Processing device 208 may also manage, configure, write to, read from, etc., the TCAMs 218A-C. Additionally, processing device 208 can read data from the hardware forwarding engines 212A-C. In one embodiment, data plane 202 receives, processes, and forwards network data using various configuration data (e.g., forwarding, security, quality of service (QoS), and other network traffic processing information). Data plane 202 includes multiple network interface devices 206A-C (e.g., line cards, etc.) that can each receive, process, and/or forward network traffic. Each of interface devices 206A-C includes multiple ports 216A-C that are used to receive and transmit network data.

In one embodiment, for each received packet (e.g., unit of network data), data plane 202 determines a destination address for the network data, looks up the requisite information for that destination in one or more tables stored in the data plane, and forwards the data out the proper outgoing interface, for example, one of interface devices 206A-C. In one embodiment, each interface device 206A-C includes one or more hardware forwarding engines (HWFE(s)) 212A-C, processing device 214A-C, and ports 216A-C, respectively. Each hardware forwarding engine 212A-C forwards data for the network device 102, performing routing, switching, or other types of network forwarding. Each processing device 214A-C can be used to accelerate various functions of interface devices 206A-C. For example and in one embodiment, processing devices 214A-C can be configured to program corresponding hardware forwarding engines 212A-C. Processing devices 214A-C can also push data from hardware forwarding engines 212A-C to a processing device 208 in control plane 204.

In one embodiment, control plane 204 gathers the configuration data for hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to hardware forwarding engines 212A-C.

In one embodiment, the memory 209 that is used to store data for control plane 204 is shared with data plane 202. In such embodiment a direct memory access (DMA) controller 218 is coupled to memory 209 to allow processing devices 214A-C direct access to memory 209. In one embodiment, DMA controller 218 allows processing devices 214A-C to directly access the memory 209 without requiring processing device 208 in control plane 204 to send data to each processing device 214A-C. In one embodiment, control plane 204 includes a policy engine 211 to apply a QoS policy to network traffic flowing through network device 102. Policy engine 211 can be configured to minimize the latency of some type of network traffic, or to apply traffic shaping policies on the overall flow of traffic through the network device, or within a larger network topology. Proper determination of real-time latency data within the network can be key to the implementation of effective QoS policy. In one embodiment, logic to perform the timing of network data flow is consolidated into the hardware of data plane 202 of each network device 102.

As illustrated in FIG. 2, interface device 206A includes TCAM 218A, interface device 20613 includes TCAM 21813, and interface device 206C includes TCAM 218C. A TCAM may be a content addressable memory that allows for faster access to data stored in the TCAM using a key. The TCAM may return data for all entries in the TCAM that match a key. The key may include an encoded label and/or a merged encoded label. For example, the key may include multiple portions, fields, etc., and the encoded label and/or the merged encoded label may be one of the portions/fields. Encoded labels and merged encoded labels are discussed in more detail below. A TCAM may be a more expensive component than other types of memory (e.g., may be more expensive that dynamic random access memory (DRAM)). A TCAM may also use more power than other types of memory e.g., may use more power than DRAM) to operate. Because a TCAM may be more expensive and operate (e.g., may use more power), the amount of space (e.g., storage space, storage size, etc.) in a TCAM may be smaller than the amount of space in other types of memory (e.g., in DRAM of flash memory). Thus, it may be useful to decrease and/or minimize the number of entries that are used in a TCAM where possible. Decreasing and/or minimizing the number of entries that are used by the network device 102 may allow the network device 102 to store additional entries in TCAMs 218A-C without increasing the size of TCAMS 218A-C. For example, if TCAM 218A can store 100 entries and the network device can reduce the number of entries that are used to check for certain packet characteristics from 25 to 10, then the number of available entries in TCAM 218A can be increased without increasing the size of TCAM 218A.

Figure 3:
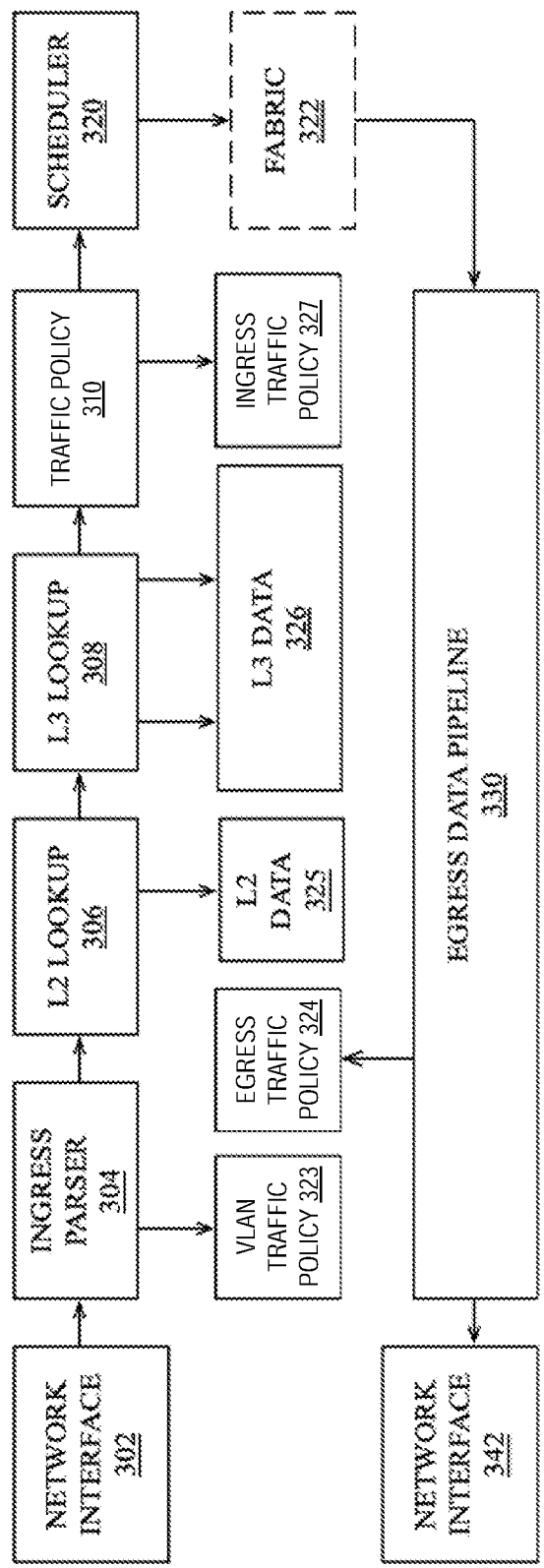
FIG. 3 is a block diagram of an example forwarding pipeline a network device, in accordance with some embodiments.

FIG. 3 is a block diagram of an example forwarding pipeline 300 within a network device, in accordance with some embodiments. In one embodiment, the forwarding pipeline 300 resides in a hardware forwarding engine (e.g., HWFE 212), which includes logic from one or more of HWFE(s) 212 within each interface 206 shown in FIG. 2. FIG. 3 focuses primarily on the ingress aspects of the forwarding pipeline 300. However, the embodiments, implementations, examples, etc., described herein may also be used separately or in conjunction with the egress aspects of the forwarding pipeline (e.g., egress data pipeline 330). As illustrated, the forwarding pipeline 300 includes an ingress network interface 302, an ingress parser 304, a data-link layer lookup (e.g., L2 lookup 306), a network layer lookup (e.g., L3 lookup 308), an traffic policy processing block 310, and a scheduler 320.

In one embodiment, traffic policies including a VLAN traffic policy 323, Ingress routed traffic policy and QOS traffic policy or policy based routing 327, and Egress traffic policy 324 allow policy and filtering actions to be performed on network data at multiple stages within the forwarding pipeline 300. The traffic policies store an ordered list of rules that define access restrictions for entities of the network device, including a specified network interface (e.g., ingress network interface 302, egress network interface 342). In one embodiment, network data may be forwarded to the control plane of the network device, and a traffic policy can be configured to specify access restrictions to the control plane. The traffic policy rules e.g., packet classifier rules) specify the data to which fields of network data are compared. A traffic policy may also be referred to as a packet classifier. For example, a traffic policy may classify a packet (e.g., may classify a packet in a type, category, group, etc.) based on a field (e.g., whether a field is present or included in a packet etc.), a value of a field, etc.

In one embodiment forwarding pipeline 300 is configured to forward packets (e.g., units of network data) that match all conditions in a permit rule and to packets that match all conditions in a deny rule. For some traffic policies e.g., packet classifiers), the forwarding pipeline is configured to implicitly deny (e.g., drop) packets that do not match at least one rule. Upon arrival at ingress network interface 302, a packet is processed based one or more ingress traffic policies associated with network interface 302 (e.g., VLAN traffic policy 323, Ingress traffic policy 327). In one embodiment, the network data can be additionally processed based on egress traffic policy 324 before being forwarded via egress network interface 342. In one embodiment, the traffic policies can be used to perform actions other than permit and deny. For example, an access control entry may be specified which sets a traffic class for a packet or sets a next hop for a packet or a politer to be applied to the networks data.

If a packet is permitted through traffic policy processing, a forwarding decision can be made for the data. The L2 data 325 and L3 data 326 modules store various tables used to perform data-link layer (layer 2) and network layer (layer 3) forwarding of network data by the forwarding pipeline 300. In one embodiment, after processing and forwarding operations are performed by ingress elements of the forwarding pipeline, scheduler 320 forwards ingress network data to a fabric module 322, which provides data-plane connectivity between multiple packet processors in the network device. In one embodiment, a single chip solution is used for the ingress and egress pipelines of forwarding pipeline 300, omitting fabric module 322. Either through fabric module 322 or via a scheduling engine, scheduler 320 can forward the ingress network data to egress data pipeline 330 for egress processing once the set of forwarding decisions have been made. The egress data, after processing by egress data pipeline 330, is re-transmitted via an egress network interface 342. Egress data pipeline 330 can operate in parallel with other elements of the forwarding pipeline 300 described herein.

In one embodiment, forwarding operations for a packet proceeds as follows, First, the network data is received by an ingress network interface 302. For embodiments including Ethernet interfaces, network interface 302 includes a physical layer (PHY) and a media access control (MAC) layer. The PHY layer is responsible for transmission and reception of bit streams across physical connections including encoding, multiplexing, synchronization, clock recovery and serialization of the data on the wire for whatever speed/type of Ethernet interface is configured. Operation of the PHY complies with the IEEE 802.3 standard. The PHY layer transmits/receives the electrical signal to/from the transceiver where the signal is converted to light in the case of an optical port/transceiver. In the case of a copper (electrical)

interface, e.g., Direct Attach Cable (DAC), the signals are converted into differential pairs.

If a valid bit stream is received at the PHY, the data is sent to the MAC layer. On input, the MAC layer is responsible for turning the bit stream into frames, packets, or another division of network data based on the supported and implemented protocols and standards of the network device. This operation can include performing error checking and finding the start and end delimiters for the packet. In one embodiment, while the entire packet is received at the MAC/PHY layer only header data is sent through to the remainder of forwarding pipeline 300.

In one embodiment, headers for the packet are parsed at an ingress parser 304, which extracts key fields used to make forwarding decisions. For a typical Internet Protocol version 4 (IPv4) packet, the ingress parser 304 can extract a variety of layer 2, layer 3, and layer 4 headers, including source and destination MAC addresses, source and destination IP addresses, and source and destination port numbers. In one embodiment, the ingress parser 304 also determines the VLAN ID of the packet. Where the packet has arrived via a trunk port, the VLAN ID can be determined based on a VLAN header. When the packet arrives via an access port or arrived untagged, the VLAN ID may be determined based on the port configuration.

In one embodiment, once ingress parser 304 is aware of the VLAN ID and ingress interface ingress parser 304 verifies the spanning tree protocol (STP) port state for the receiving VLAN. In one embodiment, the network device supports the rapid spanning tree protocol (RSTP). If the port STP/RSTP state indicates that the packet should be forwarded (e.g., blocking, listening, discarding, learning, etc.) the packet is dropped. If the STP/RSTP state is learning, the MAC address table is populated with information from the packet and the packet is dropped. If the port STP state is forwarding, then the headers for the packet are allowed to proceed down the pipeline.

In one embodiment, ingress parser 304 can perform a further comparison for the packet against any configured Port traffic policies by performing a lookup in the VLAN traffic policy 323. If the packet matches a DENY statement, the p will be dropped. If the packet matches a PERMIT statement, or no port traffic policy is enabled, the packet is passed to the next block of the pipeline. Successive stages include L2 lookup 306 and a L3 lookup 308 stages. L2 lookup 306 stage will reference L2 data 325, which may be a MAC address table, which is an exact-match table. L3 lookup 308 will reference L3 data 326, which includes an exact-match table that contains /32 IPv4 and /128 IPv6 host routes, and a longest-prefix match (LPM) table that contains IPv4 and IPv6 routes that are not host routes.

Figure 4:
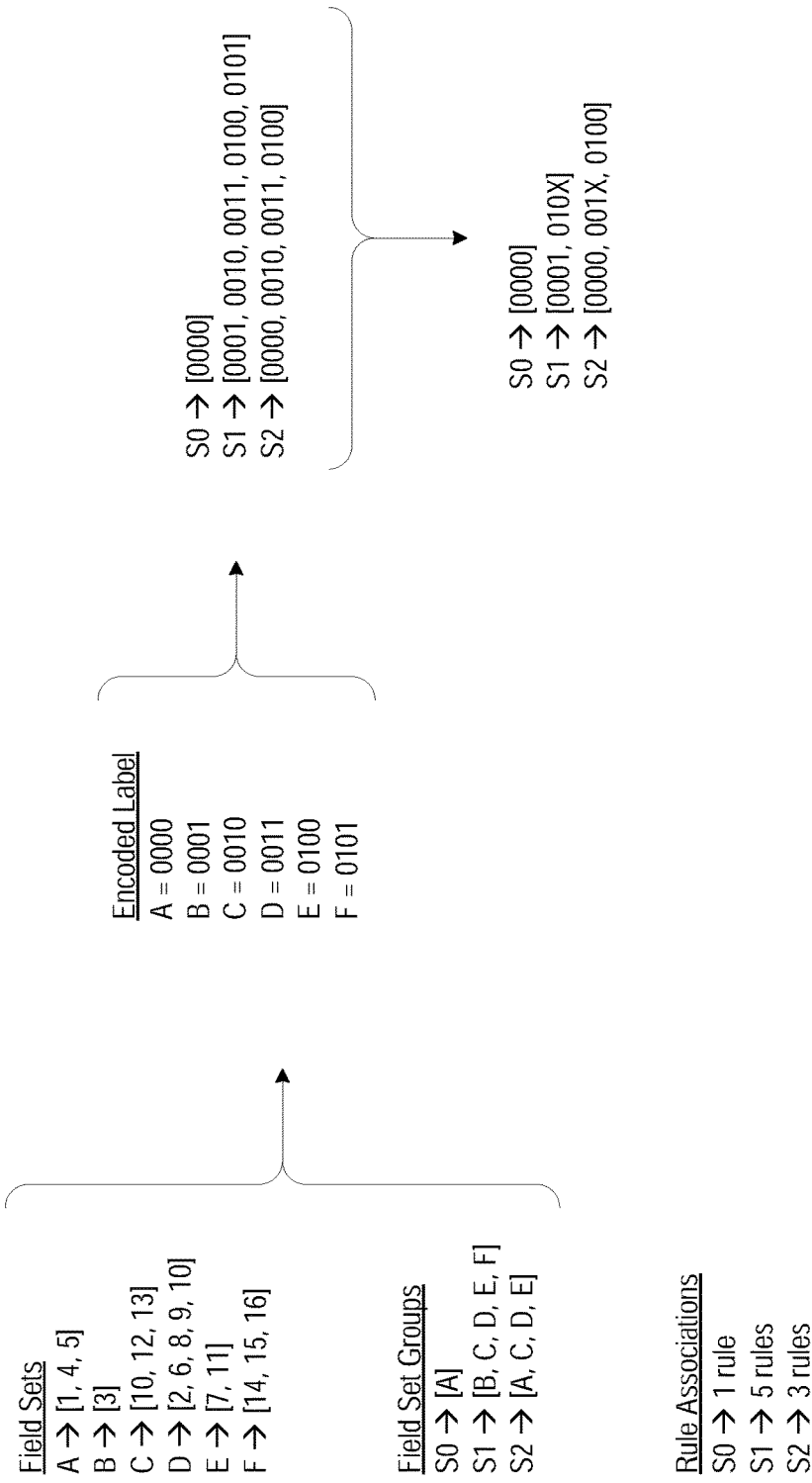
FIG. 4 is a diagram illustrating example packet characteristics, field sets, and field set groups, according to one or more embodiments.

FIG. 4 is a diagram illustrating example packet characteristics (e.g., fields), field sets, and field set groups, according to one or more embodiments. A packet characteristic may be a field and/or value of data packets that are communicated by a network device. For example, a packet characteristic may be a source address (IPv4, IPv6, Ethernet, or some other type of address), destination address (IPv4, IPv6, Ethernet, or some other type of address), source layer 4 port number, destination layer 4 port number, differentiated services code point (DSCP), Transmission Control Protocol/User Datagram Protocol (UDP) ports, a type of the packet, a timeout value, and/or other types of packet characteristics. Packet characteristics may be obtained from a packet header, a packet footer, and/or the payload of a packet. Packet characteristics may also be referred to as fields, field values, values, etc. As illustrated in FIG. 4, there may be sixteen packet characteristics (e.g., values for one or more fields) 1 through 16 that a network device network device 102 illustrated in FIGS. 1 and 2) may be interested in. In one embodiment, a processing device of the network device (e.g., processing device 208 illustrated in FIG. 2, a processor, an ASIC, a FPGA, etc.) may determine compute, identify, obtain, etc.) a plurality of field sets A through F. The identifiers for the field sets (e.g., the identifiers A-F) may be summarized values, as discussed above. Each field set A through F includes one or more packet characteristics. For example, field set A includes packet characteristics 1, 4, and 5, field set B includes packet characteristic 3, etc. The fields sets A through F may be disjoint sets (e.g., may ay be disjoint, may not intersect, may not overlap, etc.). Two or more sets may be disjoint sets of the sets have no elements in common. For example, field sets A through F may be disjoint sets because field sets A through F have no packet characteristics in common (e.g., no packet characteristic is included in more than one field set). Field sets A through F may also be referred to as disjoint field sets, non-overlapping field sets, non-intersecting field sets, etc.

Field sets A through F may be organized into field sets groups S0 through S2. Each field set group S0 through S2 includes one or more of field sets A through F, For example, field set group S0 includes field set A, field set group S1 includes field sets B, C, E, and F, and field set group S2 includes field sets A, C, D, and E, Each of field set groups S1 through S3 is associated with one or more ternary content addressable memory (TCAM) rules. For example, S0 is associated with one packet classifier rule, S1 is associated with five packet classifier rules, and S2 is associated with three packet classifier rules.

Encoded labels may be generated for field sets A through F. An encoded label may also be referred to as a label, an encoding, a key, etc. An encoded label (e.g., a label) may be a bit string (e.g., a series of bits, a binary string, a bit string, a sequence of bits, etc.) that may be used to represent, indicate, etc., a field set. For example, field set A may be represented using the bit string 0000 (e.g., an encoded label), field set B may be represented using the bit string 0001, field set C may be represented using the bit string 0010, field set D may be represented using the bit string 0011, field set E may be represented using the bit string 0100, and field set F may be represented using the bit string 0101. Assigning a bit string to a field set may also be referred to as encoding a label or generating an encoded label. The encoded labels illustrated in the figures may be four bits long, but the encoded labels may be different lengths (e.g., may be eight bits long, sixteen bits long, or any appropriate length) in other embodiments.

After generating encoded labels for field sets A through F, the field sets in each of field set groups S0 through S2 may be represented using the encoded labels. For example, field A in field set groups S0 and S2 may be represented as 0000, field set B in field set group S1 may be represented as 0001, field set C in field set groups S1 and S2 may be represented as 0010, etc. One or more of the encoded labels may be merged into a merged encoded label (e.g., a merged encoded label, a merged bit string, a merged bit sequence, etc.) A merged encoded label may include the values 0, 1, or X at each position in the label. The value X at a particular position in a merged encoded label may indicate that either the value 0 or 1 may be at the particular position. For example, encoded label 0010 (which represents field set C) and the encoded label 0011 (which represents field set D) may be merged into a merged encoded label 001X, which represents both field set C and field set D.

After merging the encoded labels that are capable of being merged, S0 includes encoded label 0000, S1 includes encoded label 0001, merged encoded label 001X, and merged encoded label 010X, and S2 includes encoded label 0000, merged encoded label 001X, and encoded label 0100. As discussed above, S0 is associated with one packet classifier rule, S1 is associated with five packet classifier rules, and S2 is associated with 3 packet classifier rules. Field set group S0 will use one entry in the TCAM (e.g., one encoded label multiplied by one rule associated with field set group S0) to process packets that have packet characteristics which match the packet characteristics in field set A. Field set group S1 may use fifteen entries in the TCAM (e.g., three encoded labels multiplied by five rules associated with field set group S1) to process packets that have packet characteristics which match the packet characteristics in field sets B, C, D, E, and F, Field set group S2 may use nine entries in the TCAM (e.g., three encoded labels multiplied by three rules associated with field set group S2) to process packets that have packet characteristics which match the packet characteristics in field sets A, C, D, and E. Thus, a total of twenty-five entries in the TCAM (e.g., twenty-five TCAM entries) may be used.

As discussed above, a TCAM may be a more expensive component than other types of memory (e.g., may be more expensive that dynamic random access memory (DRAM)). A TCAM may also use more power than other types of memory (e.g., may use more power than DRAM) to operate. Because TCAM may be more expensive and may use more power, the amount of space (e.g., storage space, storage size, etc.) in a TCAM may be smaller than the amount of space in other types of memory (e.g., in DRAM of flash memory). Thus, it may be useful to decrease the number of entries that are used in the TCAM where possible. Decreasing the number of entries that are used to process data packets may increase the number of available entries in a TCAM without increase the size, the cost, and/or the power usage of the TCAM.

As illustrated in FIG. 4, the encoded labels for the field sets may have been determined in an arbitrary order. For example, field set A was assigned the first available bit string 0000 (e.g., was encoded as 0000), field set B was assigned the next available bit string 0001, field set C was assigned the next available bit string 0010, etc. Arbitrarily encoding may result in the usage of more TCAM entries, as discussed in more detail below.

Figure 5:
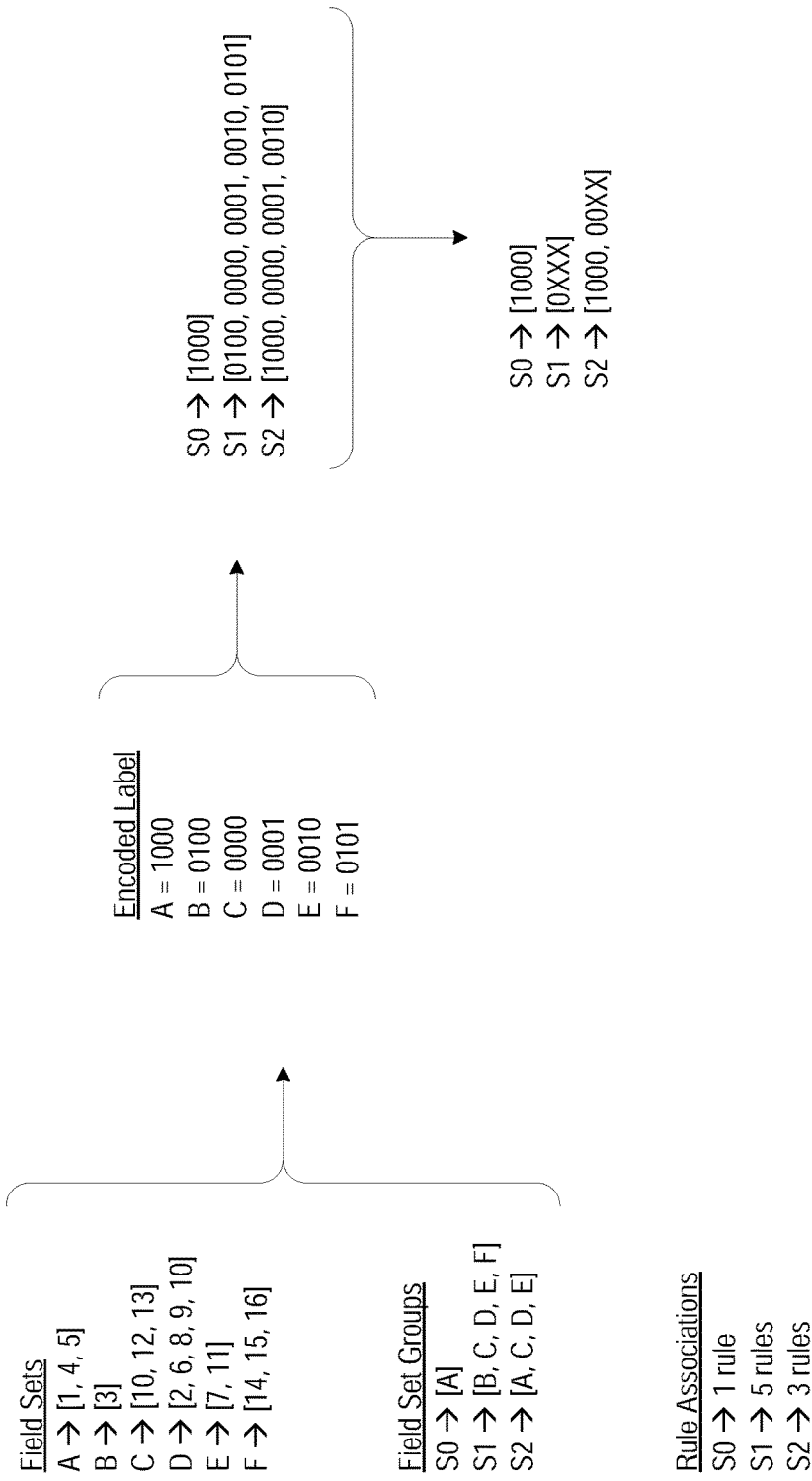
FIG. 5 is a diagram illustrating example packet characteristics, field sets, and field set groups, according to one or more embodiments.

FIG. 5 is a diagram illustrating example packet characteristics, field sets, and field set groups, according to one or more embodiments. As discussed above, a packet characteristic may be a field and/or value of data packets that are communicated by a network device. Packet characteristics may also be referred to as fields, field values, values, etc. Similar to FIG. 4, there may be sixteen packet characteristics 1 through 16 that a network device (e.g., network device 102 illustrated in FIGS. 1 and 2) may be interested in. In one embodiment, a processing device of the network device (e.g., processing device 208 illustrated in FIG. 2, a processor, an ASIC, a FPGA, etc.) may determine (e.g., compute, identify, obtain, etc.) a plurality of field sets A through F and each field set A through F includes one or more packet characteristics, as illustrated in block 605 of FIG. 6. The fields sets A through F may be disjoint sets. The identifiers for the field sets (e.g., the identifiers A-F) may be summarized values, as discussed above. Field sets A through F may be organized into field sets groups S0 through S2. Each field set group S0 through S2 includes one or more of field sets A through F. Each of field set groups S1 through S3 is associated with one or more packet classifier rules. Encoded labels may be generated for field sets A through F. An encoded label may also be referred to as a label, an encoding, etc. An encoded label (e.g., a label) may be a bit string (e.g., a series of bits, a binary string, a bit string, a sequence of bits, etc.) that may be used to represent, indicate, etc., a field set.

As discussed above, arbitrarily encoded labels arbitrarily assigned bit strings to different field sets) may result in using a larger number of encoded labels to represent the field sets in a field set group. Reducing the number of encoded labels used to represent the field sets in a field set group may reduce the number of entries used in a TCAM, as discussed above.

Figure 6:
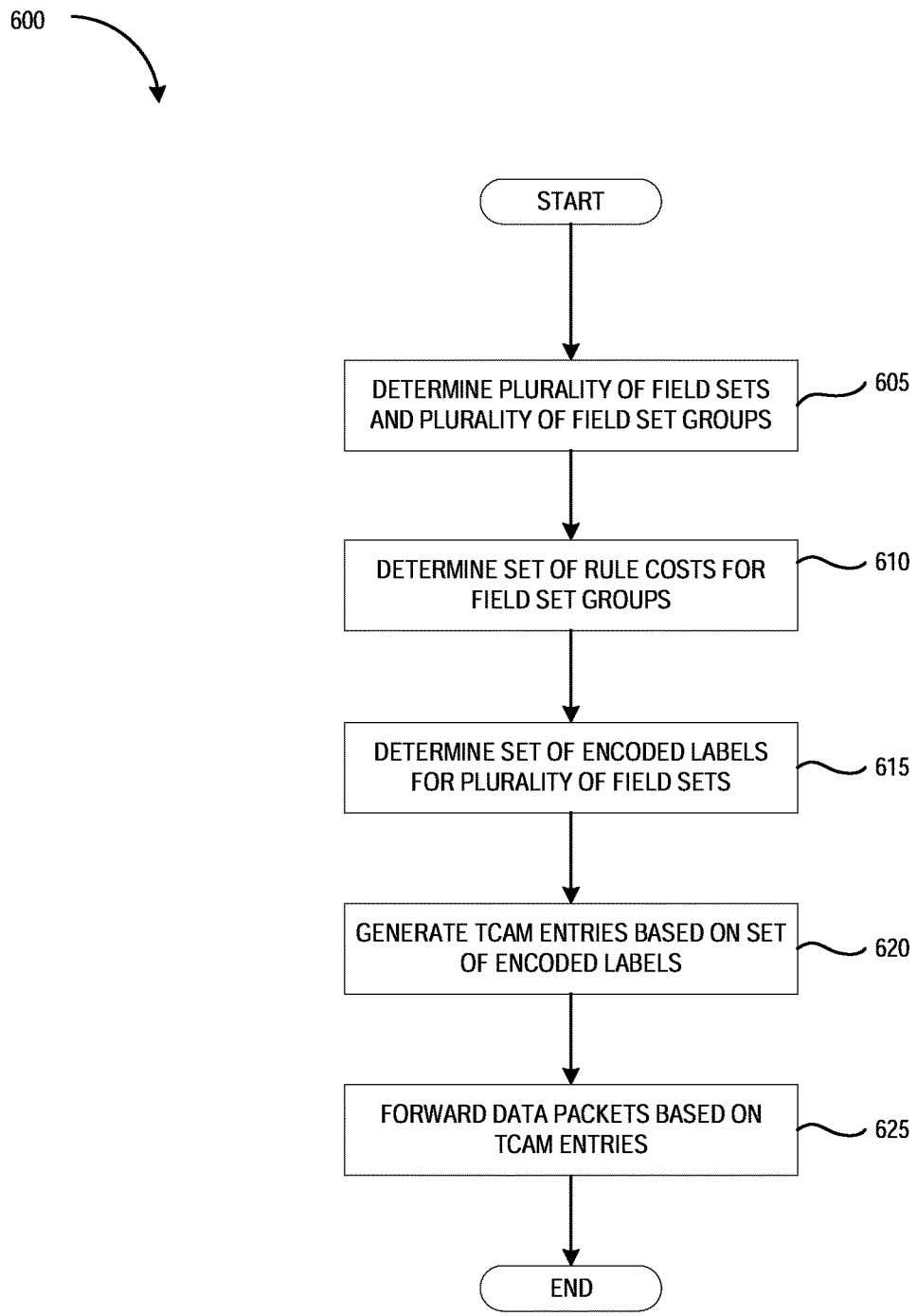
FIG. 6 is a flow diagram of a method of generating entries in a TCAM, in accordance with some embodiments.

In one embodiment, a processing device (e.g., processing device 208 illustrated in FIG. 2, a CPU, a processor, an ASIC, an FPGA, etc.) may determine a set of encoded labels (e.g., one or more encoded labels) for field sets A through F based on a set of rule costs and intersections between field set groups, as illustrated in block 610-615 of FIG. 6. The processing device may determine a rule cost for each field set group S0, S1, and S2, as illustrated in block 610-615 of FIG. 6. The rule cost for a field set group may be determine by multiplying the number of field sets in a field set group with the number of packet classifier rules associated with the field set group. For example, the rule cost for field set group S0 may be 1 (e.g., one packet classifier rule associated with field set group S multiplied by one field set in field set group S0). The rule costs for field set group S1 may be 25 (e.g., five packet classifier rules associated with field set group S1 multiplied by five field sets in field set group S1). The rule cost for field set group S2 may be 12 (e.g., three packet classifier rules associated with field set group S1 multiplied by four field sets in field set group S2). The processing device may select a first field set group with the highest (e.g., largest) rule cost, as illustrated in block 710 of FIG. 7. For example, the processing device may select field set group S1 because field set group S1 has the highest rule cost a rule cost of 25). If there are multiple field set groups that have the same, highest rule cost, the processing device may randomly select one of the multiple field set groups.

In one embodiment, the processing device may determine one or more ranges of encoded labels that may be used to represent the field sets in the first field set group S0. The range of encoded labels may be greater than or equal to the number of field sets in the first field set group S0. For example, field set group S0 includes five field sets. The processing device may select a range of eight encoded labels starting from 0000 through 0111 that may be used to represent the field sets in the first field set group S0. The range of encoded labels may be aligned at the nearest power of two that is greater than or equal to the number of field sets in the first field set group S0. For example, the nearest power of two that is greater than five is eight. Thus, the range of encoded labels is selected such that the range includes eight continuous bit sequences 0000 through 0111.

In some embodiments, if the available ranges of encoded labels are not enough for the number of field sets in a field set group, field set groups may be divided or distributed across multiple ranges of encoded labels. For example, the processing device may determine multiple separate ranges of encoded labels that may be used to represent the field sets in the first field set group S0. Each of multiple separate ranges may also be aligned at the powers of two. For example, if there are six labels to be encoded, a single range of eight labels (e.g., 2 to the power of 3) may be allocated to the six labels. In another example, if there are six labels to be encoded, a first range of four labels (e.g., 2 to the power of 2) and a second range of two labels (e.g., 2 to the power of 1) may be allocated to the six labels.

In one embodiment, the processing device may also select a second field set group. The second field set group may have the next highest rule cost or may have a rule cost equal to the rule cost for the first field set group (e.g., equal to the highest rule cost). For example, the processing device may select field set group S2 because field set group S2 has the next highest rule cost (e.g., a rule cost of 12).

Figure 7:
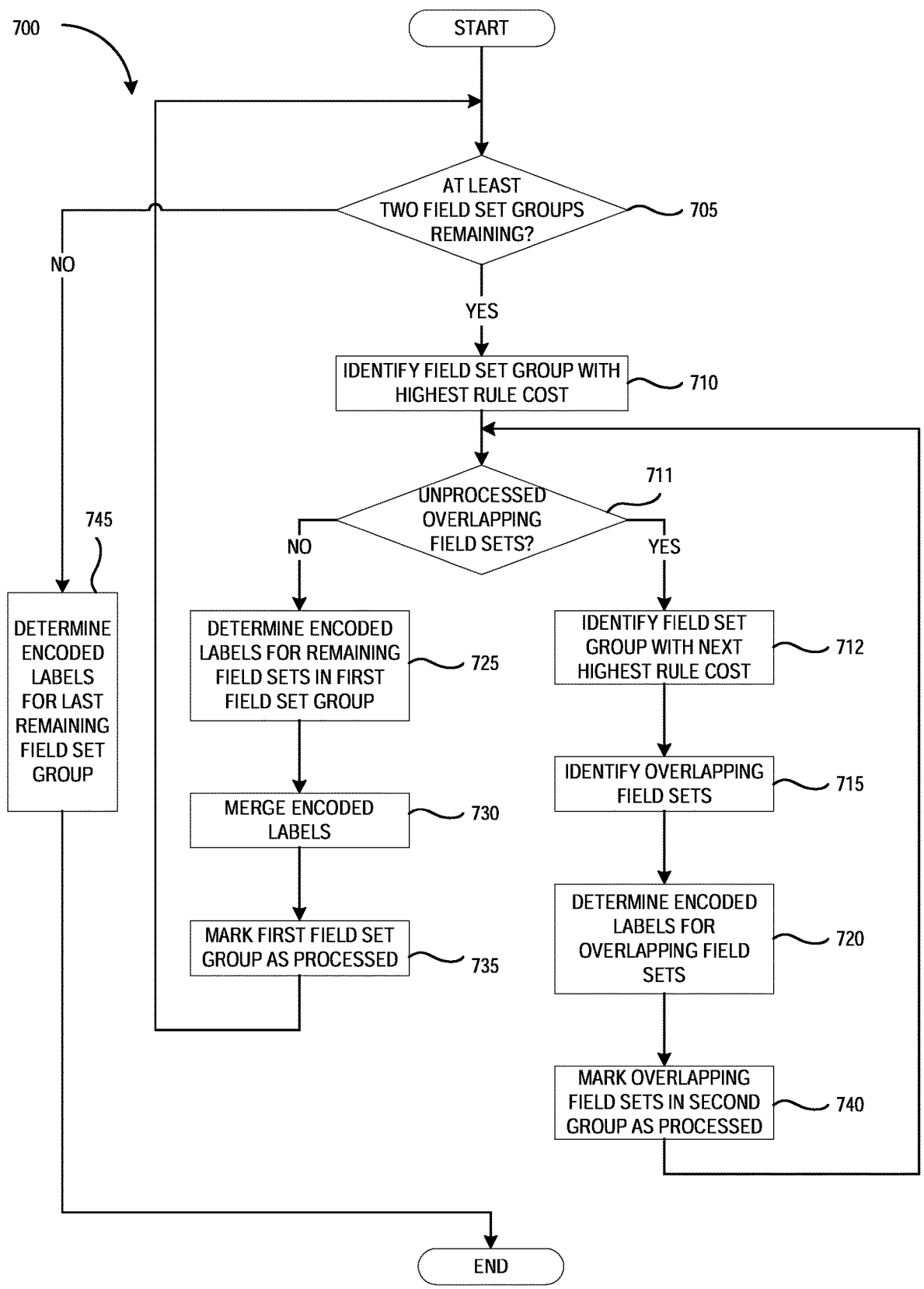
FIG. 7 is a flow diagram of a method of determining encoded labels, in accordance with some embodiments.

In one embodiment, the processing device may identify overlapping field sets that are in both the first field set group S1 and the second field set group S2, as illustrated in block 715 of FIG. 7. An overlapping field set may be a field set that is in both field set group S1 and field set group S2. For example, field sets C, D, and E may be overlapping field sets. An overlapping field set may also be referred to as common field sets, shared field sets, intersecting field sets, etc.

In one embodiment, the processing device may compute (e.g., determine, calculate, generate, etc. a set of encoded labels for the overlapping field sets from the range of encoded labels that was previously determined, as illustrated in block 720 of FIG. 7. For example, the processing device may determine a set of encoded labels (for the overlapping field sets) from the range of encoded labels that includes bit sequences 0000 through 0111. As illustrated in FIG. 5, the processing device determines encoded label 0000 (for field set C), encoded label 0001 (for field set D), and encoded label 0010 (for field set E) because field sets C, D, and F are overlapping field sets between field set groups S1 and S2. The processing device may use various criteria for assigning encoded labels to different field sets. For example, the processing device may find the largest continuous set of labels that can fit the encoded labels for the largest group of overlapping field sets. The processing device may also assign the encoded labels such that the use of "X" values or don't care values may be maximized or increased. For example, the processing device may select encoded values that vary in the lowest two bits, so that the lowest two bits can be replaced by X values. The processing device may also select ranges of encoded labels using powers of two, as discussed above. For example, if there are six encoded labels, the processing device may select a range of eight consecutive labels. Although two of the labels in the range of eight labels may not be used, assigning a larger range of labels may allow the processing device to maximize the use of X values by selectively assigning encoded labels that vary in selected bit positions. For example, by assigning encoded labels that vary in the lowest 3 bits, the processing device may be able to use X values in the lowest 3 bits to represent the six encoded labels.

In one embodiment, the processing device may identify non-overlapping field sets that are in the first field set group S1. For example, field sets B and F are not in field set group S2 but are in field set group S1. The non-overlapping field sets may be the remaining field sets that are in the first field set group S1 after the overlapping field sets have been assigned an encoded label. The processing device may determine (e.g., calculate, generate, etc.) a set of encoded labels for the non-overlapping field sets from the range of encoded labels that was previously determined. For example, the processing device may determine a set of encoded labels (for the overlapping field set groups) from the range of encoded labels that includes bit sequences 0000 through 0111 which have not already been used to represent other field sets. As illustrated in FIG. 5, the processing device determines encoded label 0100 (for field set B) and encoded label 0101 (for field set F) because field sets B and F are not in field set group S2.

After generating encoded labels for field sets in the field set group S1, the processing device may merge multiple encoded labels to determine one or more merged encoded labels, as illustrated in block 730 of FIG. 7. As discussed above the range of encoded labels from 0000 to 0111 may be allocated to the field sets in the field set group S1. Because the encoded label 0011 is allocated but not used (e.g., due to the range of encoded labels being larger than the number of field sets in the field set group S1), the processing device may merge the encoded labels, 0100, 0000, 0001, 0010, and 0101, and the unused encoded label 0011 into a single merged encoded label 0XXX.

In one embodiment, the processing device may iteratively determine ranges of encoded labels that may be used to represent fields sets, identify overlapping and/or non-overlapping field sets between two field set groups (e.g., the next two field set groups with the highest cost), determine which encoded labels from the ranges of encoded labels should be assigned to which field sets, and merge encoded labels, as illustrated in blocks 705-745 of FIG. 7. For example, after the processing device has determined (e.g., assigned) encoded labels for all of the field sets in field set group S1, the processing device may determine whether there are at least two field set groups left (as illustrated in block 705 of FIG. 7) and identify a first field set group with highest rules cost (as illustrated in block 710 of FIG. 7). For example, the processing device may identify field set group S2. The processing device may determine whether there are overlapping field sets in the field set group S2 (e.g., whether there are field sets in S2 that are also in other field sets as illustrated in block 711 of FIG. 7. As illustrated in FIG. 5, field set group A is in both S2 and S0. The processing device may identify a second field set that has the next highest rule cost (e.g., field set S0, as illustrated in block 712 of FIG. 7. The processing device may determine a range of encoded labels (e.g., the range of encoded labels from 1000 to 1111). Field set group S2 includes field sets C, D, and E which have already been assigned encoded labels. Because field sets C, D, and E are not in field set group S0, the encoded label for field sets C, D, and E are not used. In addition, field sets C, D, and E were previously assigned encoded labels so they are not re-assigned encoded labels. However, field set A is in field set groups S0 and S2 (e.g., field set A is an overlapping field set). The processing device may determine an encoded label for field set A from the range of encoded labels that goes from 1000 to 1111, as illustrated in block 720 of FIG. 7. As illustrated in FIG. 5, the processing device may use the encoded label 1000 to represent the field set A. The processing device may mark the overlapping field sets in the second field set group as processed (as illustrate in block 740 of FIG. 7), and may continue to check if there are at least two field set groups remaining (as illustrated in block 705 of FIG. 7).

If there are no overlapping field sets in the first and second field sets, the processing device may determine encoded labels for the remaining field sets in the first field set group, as illustrated in block 725 of FIG. 7. The processing device may also merged the encoded labels which represent field sets C, D, and E (e.g., 0000, 0001, and 0010) into the merged encoded label 00XX, as illustrated in block 730 of FIG. 7. After the field sets in field set groups S1 and S2 have been assigned encoded labels, the processing device may proceed with the last field set group S0. However, field set group S0 has one field set A, and field set A has already been assigned an encoded label so field set group S0 has also been processed.

After computing (e.g., determining) an encoded label for each of the field sets and merging the encoded field sets are capable of being merged, the processing device may generate TCAM entries based on the encoded labels. For example, for the field set group S0, the processing device may generate one TCAM entry for encoded label 1000 (e.g., one TCAM entry that includes the encoded label 1000 and the one rule associated with field set group S0). For the field set group S1, the processing device may generate five TCAM entries for the merged encoded label 0XXX (e.g., each of the five entries includes the merged encoded label 0XXX and one of the five packet classifier rules associated with the field set group S1). For the field set group S2, the processing device may generate six TCAM entries (e.g., three of the six entries include the merged encoded label 00XX and three of the six entries include the encoded label 1000).

As discussed above, a TCAM may be a more expensive component than other types of memory and may also use more power than other types of memory (e.g., may use more power than DRAM) to operate. Because TCAM may be more expensive and may use more power, the amount of space in a TCAM may be smaller than the amount of space in other types of memory (e.g., in DRAM of flash memory). Thus, it may be useful to decrease the number of entries used to store the rules for different field set groups. Decreasing the number of entries used to store the rules for field set groups allows the other entries to be used to store rules for other field set groups.

After merging the encoded labels that can be merged, S0 includes encoded label 1000, S1 includes merged encoded label 0XXX, and S2 includes encoded label 1000 and 00XX. As discussed above. S0 is associated with one packet classifier rule, S1 is associated with five packet classifier rules, and S2 is associated with 3 packet classifier rules. Field set group S0 will use one entry in the TCAM (e.g., one encoded label multiplied by one rule associated with field set group S0) to process packets that have packet characteristics which match the packet characteristics in field set A. Field set group S1 may use five entries in the TCAM (e.g., one merged encoded label multiplied by five rules associated with field set group S1) to process packets that have packet characteristics which match the packet characteristics in field sets B, C, D, E, and F. Field set group S2 may use six entries in the TCAM (e.g., two encoded labels multiplied by three rules associated with field set group S2) to process packets that have packet characteristics which match the packet characteristics in field sets A, C, D, and E. Thus, a total of twelve entries in the TCAM (e.g., twelve TCAM entries) may be used. The encoding of the field sets results illustrated in FIG. 5 results in a reduction in the number of TCAM entries that are used when compared to the number of TCAM entries used in FIG. 4 (e.g., 25 TCAM entries). Because fewer TCAM entries are used in the example illustrated in FIG. 5, more TCAM entries are available for store packet classifier rules for other field set groups, which increases the efficiency of the TCAM. For example, the TCAM can store more packet classifier rules without increasing the size of the TCAM.

FIG. 6 is a flow diagram of a method of generating entries in a TCAM, in accordance with some embodiments. Method 600 may be performed by processing logic that may comprise hardware (e.g., circuitry, dedicated logic, programmable logic, a processor, a processing device, a central processing unit (CPU), a system-on-chip (SoC), an ASIC, and FPGA, etc.), software (e.g., instructions running/executing on a processing device), firmware (e.g., microcode), or a combination thereof. In some embodiments, method 600 may be performed by a network device (e.g., network device 102 illustrated in FIGS. 1 and 2) or a processing device (e.g., processing device 208 illustrated in FIG. 2). It should be appreciated that the actions of method 600 in FIG. 6 can be performed in differing orders, groupings, or subsets than shown in FIG. 6, for various purposes or user preferences.

Method 600 begins at block 605 where the network device determines a plurality of field sets and a plurality of field set groups. As discussed above, a field set may include one or more packet characteristics and the plurality of field sets groups may be disjoint sets. Each field set group may include one or more field sets, Each field set group may be associated with one or more packet classifier rules. At block 610, the network/device may determine a set of rule costs for the field set groups. For example, the network device may determine a rule cost for each field set group, as discussed above. At block 615, the network device may determine a set of encoded labels for the plurality of field sets based on one or more rule costs and/or intersections between field set groups. For example, the network device may iteratively determine ranges of encoded labels that may be used to represent fields sets, identify overlapping and non-overlapping field sets between two field set groups starting with the field set groups with the highest rule costs and proceeding to the field set groups with the next highest rule costs, determine which encoded labels from the ranges of encoded labels should be assigned to which field sets, and merge encoded labels, as discussed above and in FIG. 7. At block 620, the network device may generate TCAM entries based on the encoded labels, as discussed above. At block 625, the network device may forward data packets (e.g., network data, frames, messages, etc.) based on the TCAM entries. For example, the network device may process and/or forward data packets based on an entry in the TCAM (e.g., based on a rule in the entry in the TCAM).

FIG. 7 is a flow diagram of a method of determining encoded labels, in accordance with some embodiments. Method 700 may be performed by processing logic that may comprise hardware (e.g., circuitry, dedicated logic, programmable logic, a processor, a processing device, a central processing unit (CPU), a system-on-chip (SoC), an ASIC, and FPGA, etc.), software (e.g., instructions running/executing on a processing device), firmware (e.g., microcode), or a combination thereof. In some embodiments, method 700 may be performed by a network device (e.g., network device 102 illustrated in FIGS. 1 and 2) or a processing device (e.g., processing device 208 illustrated in FIG. 2). It should be appreciated that the actions of method 700 in FIG. 7 can be performed in differing orders, groupings, or subsets than shown in FIG. 7, for various purposes or user preferences.

Method 700 begins at block 705 where the network device may determine whether there are at least, two field set groups remaining. For example, the network device may determine whether there are at least two field set groups that include field sets which have not been assigned encoded labels. If there is one field set group remaining (e.g., one field set group that has not been processed and/or includes a field set that has not been processed), the network device may determine encoded labels for the last remaining field set group at block 745. If there are at least two field set groups remaining, the network device may identify a first field set group with the highest rule cost at block 710. At block 711, the network device may determine whether there are one or more unprocessed overlapping field sets field sets that have not been encoded) in the field set group (identified at block 710). For example, the network device may determine whether unprocessed field sets in the first field set group are also in other field set groups. If there are one or more unprocessed field sets in the first field set group that are also in other field set groups the network device proceeds to block 712 where the network device identifies a second field set group with the next highest rule cost (e.g., second highest rule cost). At block 715, the network device may identify the overlapping field sets in the first and second field set groups. The network device may determine encoded labels for the overlapping field sets at block 720. At block 740, the network device may mark the overlapping field sets in the second field set group as processed. The network device then proceeds to block 711 where the network device may determine whether there are one or more unprocessed overlapping field sets in the field set group.

Referring to block 711, if there are no unprocessed overlapping field sets in the first field set, the network device proceeds to block 725, where the network device may determine encoded labels for the remaining field sets in the first field set group (e.g., the non-overlapping field sets). At block 730, the network device may optionally merge encoded labels. For example, the network device may merge encoded labels if two or more encoded labels are capable of being merged. At block 735, the network device may mark the first field set group as processed and/or may mark the field sets in the field set groups as processed.

Figure 8:
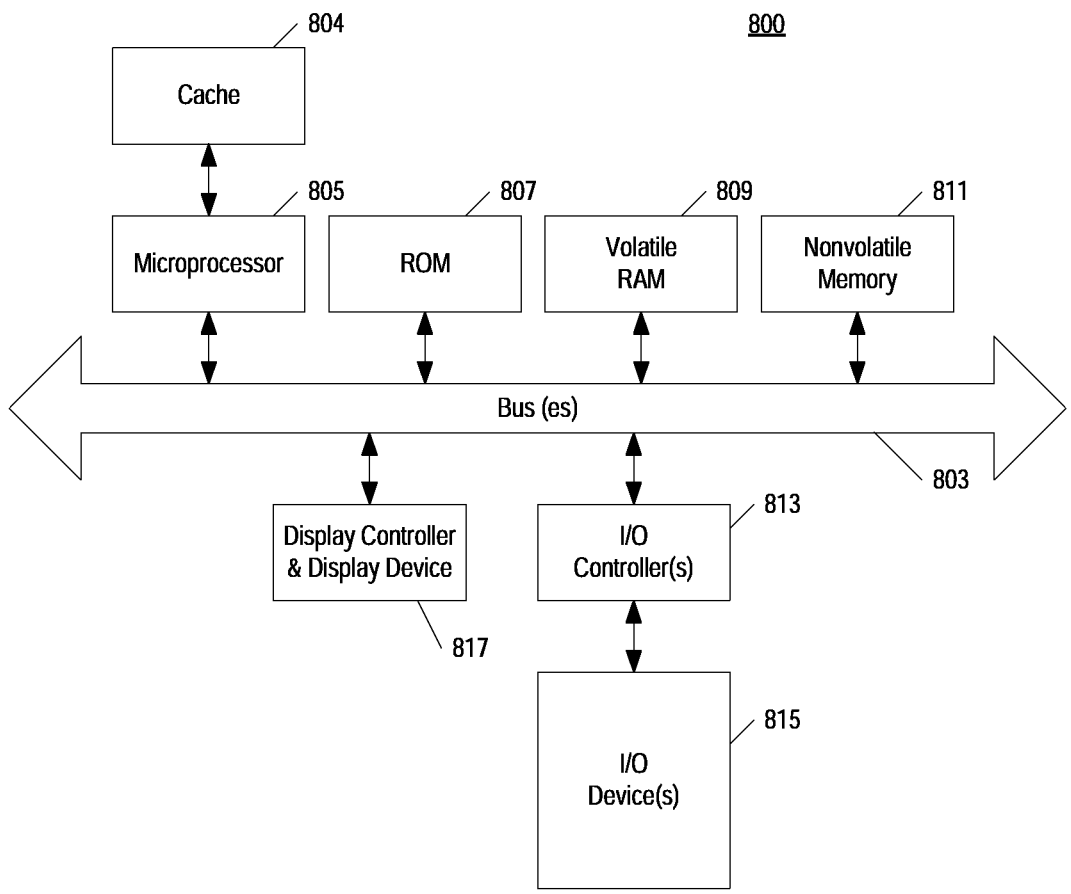
FIG. 8 shows an example a computing device, in accordance with some embodiments.

FIG. 8 shows an example computing device 800, in accordance with some embodiments. For example, the computing device 800 may be implemented including a network device 100 as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computing device 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 817 and to peripheral devices such as input/output I/O) devices which may be mice, keyboards, modems, network interfaces, printers and other devices which are well known in the art. In one embodiment, the computing device 800 includes a plurality of network interfaces of the same or different type (e.g., Ethernet copper interface, Ethernet fiber interfaces, wireless, and/or other types of network interfaces). In this embodiment, the computing device 800 can include a forwarding engine to forward network data received on one interface out another interface.

Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM/RAM or a flash memory or other types of memory systems, which maintains data (e.g., large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
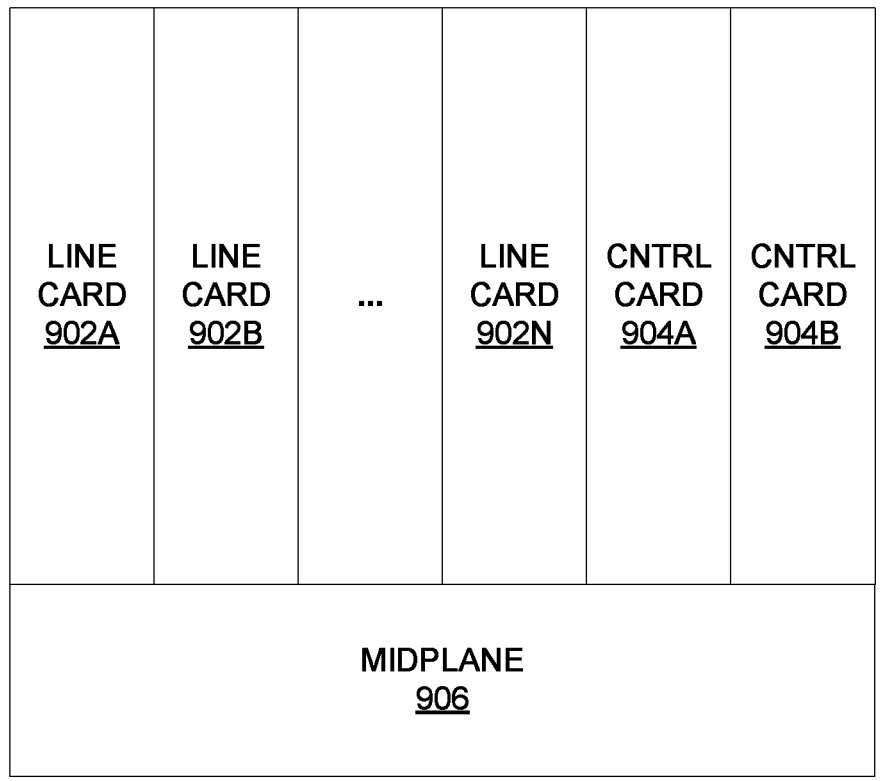
FIG. 9 is a block diagram of one embodiment of an exemplary network device, in accordance with some embodiments.

FIG. 9 is a block diagram of one embodiment of exemplary network device 900, in accordance with some embodiments. In FIG. 9, the midplane 906 couples to the line cards 902A-N and controller cards 904A-B. The midplane 906 may also be referred to as a fabric. While in one embodiment, the controller cards 904A-B control the processing of the traffic by the line cards 902A-N, in alternate embodiments, the controller cards 904A-B, perform the same and/or different functions (e.g., updating a software image on the network device, etc.). In one embodiment, the line cards 902A-N process and forward traffic according to the network policies received from the controller cards 904A-B. In one embodiment, the controller cards 904A-B may include containers, operating systems, and/or agents, as discussed above. It should be understood that the architecture of network device 900 illustrated in FIG. 9 is exemplary, and different combinations of cards may be used in other embodiments.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two blocks in a figure shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible noon-transitory computer readable medium. The computer readable medium is any data storage device that can store data, which can be thereafter read by a computer system. Examples of the computer readable medium include hard drives, network attached storage (NAS), read-only memory, random-access memory. CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component, Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   determining a plurality of field sets, each field set of the plurality of field sets comprising one or more packet characteristics;
   generating a plurality of field set groups, each field set group of the plurality of field set groups comprising a respective subset of the plurality of field sets;
   producing a plurality of encoded labels, wherein a unique encoded label is assigned to each field set, two or more mergeable encoded labels are produced for at least some of the plurality of field set groups, and the producing is performed on the plurality of field set groups in an order based on a cost associated with the each field set group;
   merging the mergeable encoded labels; and
   generating a plurality of memory entries based on the merged encoded labels.

2. The method of claim 1, wherein the each field set group is associated with one or more packet classifier rules.

3. The method of claim 2, wherein the generating the plurality of memory entries is further based on the one or more packet classifier rules.

4. The method of claim 2, wherein the cost associated with the each field set group is a product of a number of field sets in the each field set group and a number of the one or more packet classifier rules associated with the each field set group.

5. The method of claim 4, wherein the producing is performed on the plurality of field set groups in an order from a highest cost to a lowest cost.

6. The method of claim 1, wherein each field set of the plurality of field sets is a disjoint set from the other field sets.

7. The method of claim 1, wherein:
   the encoded labels each comprise a bit string; and
   the method further comprises determining a range of mergeable encoded labels for the two or more mergeable encoded labels being produced for the each field set group of the plurality of field set groups, the range of mergeable encoded labels being aligned at a nearest power of two, the nearest power of two being greater than or equal to a number of fields sets in the each field set group, and the two or more mergeable encoded labels being produced for the each field set group of the plurality of field set groups being within the determined range.

8. The method of claim 1, wherein:
   the mergeable encoded labels each comprise a bit string; and
   the merging the mergeable encoded labels comprises:
      identifying one or more bits in the two or more mergeable encoded labels produced for the each field set group that are the same and another one or more bits in the two or more mergeable encoded labels that are different; and
      producing one or more merged encoded labels including at least one of the identified one or more bits that are the same and a wildcard substituted for at least one of the identified another one or more bits that are different.

9. A network device comprising:
   a processor; and
   a memory communicatively coupled to the processor, the memory storing instructions executable by the processor to perform a method, the method comprising:
   determining a plurality of field sets, each field set of the plurality of field sets comprising one or more packet characteristics;
   generating a plurality of field set groups, each field set group of the plurality of field set groups comprising a respective subset of the plurality of field sets;
   producing a plurality of encoded labels, wherein a unique encoded label is assigned to each field set, two or more mergeable encoded labels are produced for at least some of the plurality of field set groups, and the producing is performed on the plurality of field set groups in an order based on a cost associated with the each field set group;
   merging the mergeable encoded labels; and
   generating a plurality of memory entries based on the merged encoded labels.

10. The network device of claim 9, wherein the each field set group is associated with one or more packet classifier rules.

11. The network device of claim 10, wherein:
    the one or more the one or more packet characteristics comprises one or more of a source address and a destination address;
    one or more packet classifier rules comprise one or more of a permit rule and a deny rule.

12. The network device of claim 11, wherein the generating the plurality of memory entries is further based on the one or more packet classifier rules.

13. The network device of claim 10, wherein:
    the cost associated with the each field set group is a product of a number of field sets in the each field set group and a number of the one or more packet classifier rules associated with the each field set group; and
    the producing is performed on the plurality of field set groups in an order from a highest cost to a lowest cost.

14. The network device of claim 9, wherein each field set of the plurality of field sets is a disjoint set from the other field sets.

15. The network device of claim 9, wherein:
    the encoded labels each comprise a bit string; and
    the merging the plurality of mergeable encoded labels comprises:
       identifying one or more bits in the two or more mergeable encoded labels produced for the each field set group that are the same and another one or more bits in the two or more mergeable encoded labels that are different; and
       producing one or more merged encoded labels including at least one of the identified one or more bits that are the same and a wildcard substituted for at least one of the identified another one or more bits that are different.

16. The network device of claim 9, wherein the method further comprises:
    providing the plurality of memory entries to a second memory.

17. The network device of claim 16, wherein the second memory comprises a ternary content-addressable memory (TCAM).

18. A computer-readable, non-transitory storage medium having a program stored thereon, the program being executable by a processor to perform a method, the method comprising:

determining a plurality of field sets, each field set of the plurality of field sets comprising one or more packet characteristics;

generating a plurality of field set groups, each field set group of the plurality of field set groups comprising a respective subset of the plurality of field sets;

producing a plurality of encoded labels, wherein a unique encoded label is assigned to each field set, two or more mergeable encoded labels are produced for the each field set group of the plurality of field set groups, and the producing is performed on the plurality of field set groups in an order based on a cost associated with the each field set group;

merging the mergeable encoded labels; and generating a plurality of memory entries based on the merged encoded labels.

19. The computer-readable, non-transitory storage medium of claim 18, wherein each field set of the plurality of field sets is a disjoint set from the other field sets.

20. The computer-readable, non-transitory storage medium of claim 18, wherein:

the each field set group is associated with one or more packet classifier rules;

the cost associated with the each field set group is a product of a number of field sets in the each field set group and a number of the one or more packet classifier rules associated with the each field set group; and the producing is performed on the plurality of field set groups in an order from a highest cost to a lowest cost.

* * * * *